US011822351B2

(12) United States Patent
Nishita et al.

(10) Patent No.: US 11,822,351 B2
(45) Date of Patent: Nov. 21, 2023

(54) THREE-DIMENSIONAL INFORMATION PROCESSING UNIT, APPARATUS HAVING THREE-DIMENSIONAL INFORMATION PROCESSING UNIT, UNMANNED AERIAL VEHICLE, INFORMING DEVICE, METHOD AND PROGRAM FOR CONTROLLING MOBILE BODY USING THREE-DIMENSIONAL INFORMATION PROCESSING UNIT

(71) Applicant: TOPCON CORPORATION, Tokyo (JP)

(72) Inventors: Nobuyuki Nishita, Tokyo (JP); Koji Onishi, Rotterdam (NL)

(73) Assignee: TOPCON CORPORATION, Tokyo (JP)

( * ) Notice: Subject to any disclaimer, the term of this patent is extended or adjusted under 35 U.S.C. 154(b) by 154 days.

(21) Appl. No.: 16/232,153

(22) Filed: Dec. 26, 2018

(65) Prior Publication Data
US 2020/0026310 A1    Jan. 23, 2020

(30) Foreign Application Priority Data
Dec. 27, 2017   (JP) ................................ 2017-251465

(51) Int. Cl.
*G01S 17/86* (2020.01)
*G05D 1/10* (2006.01)
(Continued)

(52) U.S. Cl.
CPC ........... *G05D 1/106* (2019.05); *B64C 39/024* (2013.01); *G01C 15/002* (2013.01); *G01S 17/42* (2013.01);
(Continued)

(58) Field of Classification Search
CPC ...................................................... G05D 1/106
See application file for complete search history.

(56) References Cited

U.S. PATENT DOCUMENTS

| 5,196,929 A | * | 3/1993 | Miyasaka | ............... G01S 3/784 |
| | | | | 396/128 |
| 6,137,569 A | * | 10/2000 | Sasaki | .................... G01C 15/00 |
| | | | | 356/138 |

(Continued)

FOREIGN PATENT DOCUMENTS

| CN | 205103998 U | 3/2016 |
| EP | 3062066 A1 | 8/2016 |

(Continued)

OTHER PUBLICATIONS

Notice of Reasons for Refusal dated Oct. 29, 2021, in connection with Japanese Patent Application No. 2017-251465, 6 pgs (including translation).

(Continued)

*Primary Examiner* — Shelley Chen
(74) *Attorney, Agent, or Firm* — CHIESA, SHAHINIAN & GIANTOMASI PC

(57) ABSTRACT

A mobile body is controlled even in a place in which a navigation signal is difficult to receive from a navigation satellite. A three-dimensional information processing unit operates a device or a functional part which measures three-dimensional coordinates of a controlled target and operates a laser scanner or a laser scanning part which obtains three-dimensional point cloud data of the target. The unit includes a positioning section that operates the device or the functional part which measures the three-dimensional coordinates, to calculate the three-dimensional coordinates, and includes a scan controlling section that obtains the three-dimensional point cloud data from the laser scanner or the laser scanning part. The unit also includes a range (Continued)

calculator that calculates a movable range of the target from the three-dimensional coordinates and the three-dimensional point cloud data, and includes a controlled target position calculator that calculates a position of the target in the movable range.

8 Claims, 9 Drawing Sheets

(51) Int. Cl.
  *B64C 39/02* (2023.01)
  *G01C 15/00* (2006.01)
  *G01S 17/42* (2006.01)
  *G06T 17/05* (2011.01)
  *B64U 101/30* (2023.01)

(52) U.S. Cl.
  CPC .............. *G01S 17/86* (2020.01); *G06T 17/05* (2013.01); *B64U 2101/30* (2023.01)

(56) References Cited

U.S. PATENT DOCUMENTS

| | | | |
|---|---|---|---|
| 8,767,190 | B2 | 7/2014 | Hall |
| 9,073,637 | B2 | 7/2015 | Ohtomo et al. |
| 9,098,754 | B1 | 8/2015 | Stout et al. |
| 10,634,496 | B2 | 4/2020 | Kumagai et al. |
| 2009/0235541 | A1 | 9/2009 | Kumagai et al. |
| 2009/0241358 | A1 | 10/2009 | Ohtomo et al. |
| 2010/0256940 | A1 | 10/2010 | Ogawa et al. |
| 2012/0242830 | A1 | 9/2012 | Kumagai et al. |
| 2014/0021066 | A1 | 1/2014 | Bamdad et al. |
| 2014/0032021 | A1* | 1/2014 | Metzler .................. B64C 19/00 701/3 |
| 2014/0210663 | A1 | 7/2014 | Metzler |
| 2014/0371952 | A1* | 12/2014 | Ohtomo ................ B64C 39/024 701/2 |
| 2015/0029322 | A1 | 1/2015 | Ragland et al. |
| 2015/0293224 | A1 | 10/2015 | Eldada et al. |
| 2016/0035081 | A1 | 2/2016 | Stout et al. |
| 2016/0253808 | A1* | 9/2016 | Metzler .................. B64C 39/02 382/103 |
| 2016/0291593 | A1* | 10/2016 | Hammond ........... G06V 20/653 |
| 2016/0292869 | A1 | 10/2016 | Hammond et al. |
| 2016/0292872 | A1* | 10/2016 | Hammond ............. G05D 1/102 |
| 2016/0349746 | A1 | 12/2016 | Grau |
| 2017/0054905 | A1* | 2/2017 | Iwasaki ................ H04N 25/531 |
| 2017/0305546 | A1* | 10/2017 | Ni ......................... G08G 5/0034 |
| 2017/0363421 | A1 | 12/2017 | Kumagai et al. |
| 2018/0023974 | A1 | 1/2018 | Otani et al. |
| 2019/0079522 | A1 | 3/2019 | Grau |

FOREIGN PATENT DOCUMENTS

| | | | | |
|---|---|---|---|---|
| EP | 3062066 A1 * | 8/2016 | ............. | B64C 39/02 |
| EP | 3205977 A1 * | 8/2017 | ............. | G01C 23/00 |
| EP | 3205977 A1 | 8/2017 | | |
| JP | 2008-268004 A | 11/2008 | | |
| JP | 2009-229192 A | 10/2009 | | |
| JP | 2010-151682 A | 7/2010 | | |
| JP | 2012-202821 A | 10/2012 | | |
| JP | 2015-001450 A | 1/2015 | | |
| JP | 2017-223540 A | 12/2017 | | |
| WO | 2016141100 A2 | 9/2016 | | |
| WO | WO-2016141100 A2 * | 9/2016 | ........... | B64C 39/024 |

OTHER PUBLICATIONS

Communication pursuant to Article 94(3) EPC dated May 4, 2020, in connection with European Patent Application No. 18211854.7, filed Dec. 12, 2018, 5 pgs.
Extended Search Report dated May 24, 2019, in connection with European Patent Application No. 18211854.7, 6 pgs.

* cited by examiner

FIG. 7

Control target position P ($X_T$, $Y_C$) is at the center ($X_C$, $Y_C$)

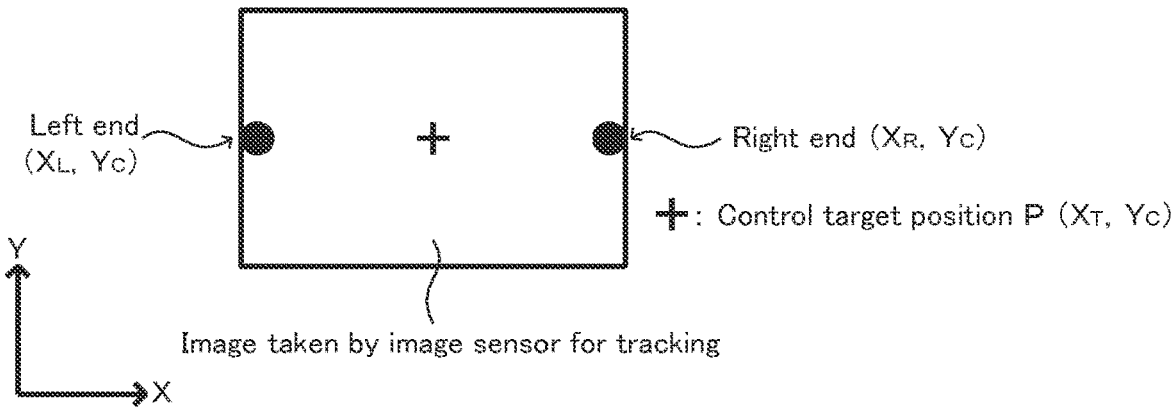

Image taken by image sensor for tracking

Control target position P ($X_T$, $Y_C$) moves from position $X_L$ to position $X_R$

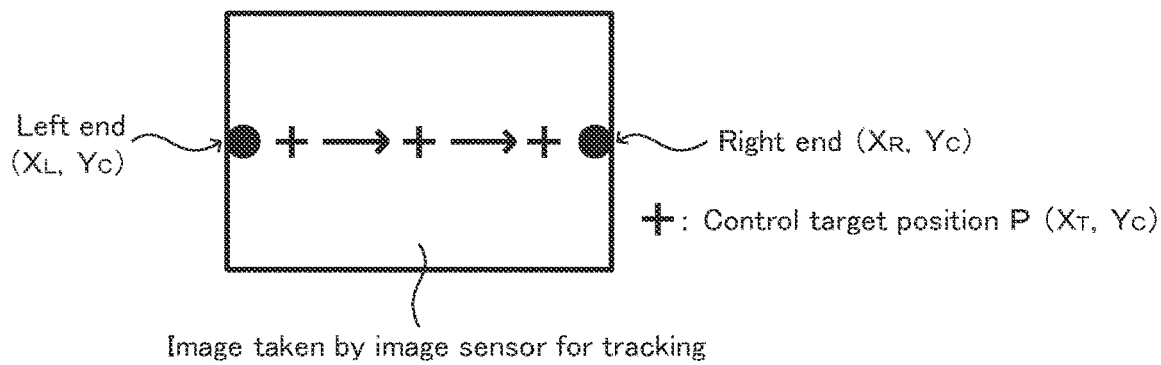

Image taken by image sensor for tracking

Prism image moves in accordance with movement of control target position P ($X_T$, $Y_C$) from position $X_L$ to position $X_R$

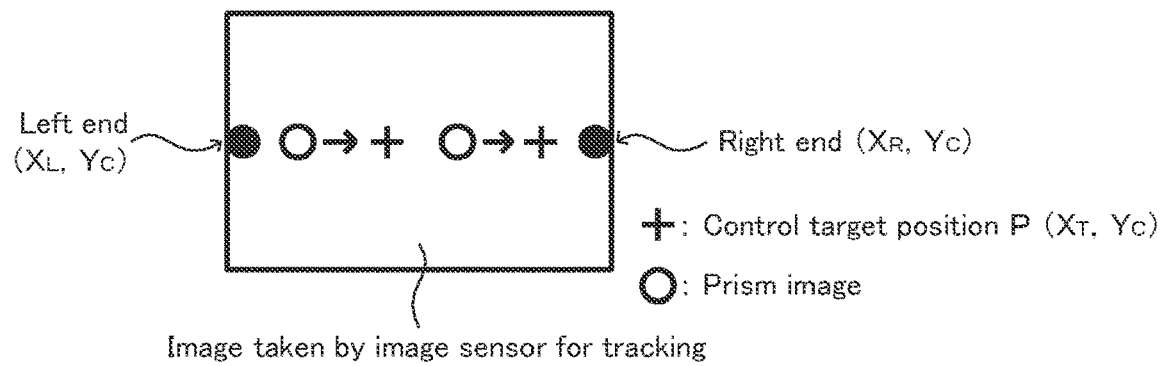

Image taken by image sensor for tracking

THREE-DIMENSIONAL INFORMATION PROCESSING UNIT, APPARATUS HAVING THREE-DIMENSIONAL INFORMATION PROCESSING UNIT, UNMANNED AERIAL VEHICLE, INFORMING DEVICE, METHOD AND PROGRAM FOR CONTROLLING MOBILE BODY USING THREE-DIMENSIONAL INFORMATION PROCESSING UNIT

CROSS-REFERENCE TO RELATED APPLICATION

This application is based upon and claims benefit of priority from Japanese Patent Application No. 2017-251465, filed Dec. 27, 2017, the entire contents of which are incorporated herein by reference.

TECHNICAL FIELD

The present invention relates to a technique for controlling a mobile body using position data and point cloud data of the mobile body.

BACKGROUND

A motor driven total station (TS) with automatic collimation and automatic tracking is publicly known as a surveying device. This TS precisely measures a position of a specific point by using distance measuring light. One such TS is disclosed in Japanese Unexamined Patent Application Laid-Open No. 2009-229192, for example. In addition, a laser scanner is publicly known as an apparatus that obtains point cloud data of an object or a target. One such laser scanner is disclosed in Japanese Unexamined Patent Application Laid-Open No. 2010-151682, for example. The TS may be used to track a flying unmanned aerial vehicle (UAV) and to determine a position of the UAV by using a laser-based distance measuring function of the TS. One such method is disclosed in US 2014/0210663, for example.

An unmanned aerial vehicle such as a UAV, a drone, or a quadcopter may be equipped with a photographing apparatus such as a camera, to perform photographing an image or a moving image. Furthermore, this unmanned aerial vehicle may also be used to perform inspection of a structure such as a bridge or a tunnel, using data of photographed images or a photographed moving image.

In most cases, inspection of a structure using an unmanned aerial vehicle is performed by making the unmanned aerial vehicle fly while maintaining a constant distance from the structure to be inspected, to maintain a constant degree of the resolution in the photographing. These cases require a control technique for making the unmanned aerial vehicle fly at a constant distance from a side surface of a structure. Normally, the flight control of the unmanned aerial vehicle uses a flight control technique that uses location information obtained from navigation signals from a navigation satellite.

SUMMARY

However, it is difficult to receive the navigation signal under a bridge or inside a tunnel in some cases. In view of this, an object of the present invention is to provide a flight control technique for an unmanned aerial vehicle. The flight control technique uses point cloud data containing three-dimensional coordinate information, thereby enabling flight control of the unmanned aerial vehicle without using a navigation signal.

A first aspect of the present invention provides a three-dimensional information processing unit. The three-dimensional information processing unit operates a device or a functional part which measures three-dimensional coordinates of a target to be controlled and also operates a laser scanner or a laser scanning part which obtains three-dimensional point cloud data of the target. The three-dimensional information processing unit includes a positioning section, a scan controlling section, a range calculator, and a controlled target position calculator. The positioning section operates the device or the functional part which measures the three-dimensional coordinates, to calculate the three-dimensional coordinates. The scan controlling section operates the laser scanner or the laser scanning part to obtain the three-dimensional point cloud data. The range calculator calculates a movable range of the target from the three-dimensional coordinates and the three-dimensional point cloud data. The controlled target position calculator calculates a position of the target in the movable range, which is calculated by the range calculator.

According to a second aspect of the present invention, in the first aspect of the present invention, the three-dimensional information processing unit may further include an automatic sighting controlling section that operates a device or a functional part for automatically sighting and tracking the target.

According to a third aspect of the present invention, in the first or the second aspect of the present invention, the three-dimensional information processing unit may further include a control movement determining section that determines movement to be performed by the target, on the basis of the position of the target in the movable range. According to a fourth aspect of the present invention, in the third aspect of the present invention, the control movement determining section may be able to change a criterion for determining the movement to be performed by the target.

According to a fifth aspect of the present invention, in any one of the first to the fourth aspects of the present invention, the three-dimensional information processing unit may further include a control signal generating section that generates a signal containing at least one of results of processes respectively performed by the range calculator, the controlled target position calculator, and the control movement determining section. According to a sixth aspect of the present invention, in the fifth aspect of the present invention, the signal that is generated by the control signal generating section may be able to make the target perform the movement that is determined by the control movement determining section.

A seventh aspect of the present invention provides an apparatus having the three-dimensional information processing unit in any one of the first to the sixth aspects of the present invention. This apparatus may include a device or a functional part that measures three-dimensional coordinates of a target to be controlled and includes a laser scanner or a laser scanning part that obtains three-dimensional point cloud data of the target.

An eighth aspect of the present invention provides an apparatus having the three-dimensional information processing unit in any one of the first to the sixth aspects of the present invention. This apparatus may include a device or a functional part that measures three-dimensional coordinates of a target to be controlled, a laser scanner or a laser scanning part that obtains three-dimensional point cloud data of the target, and a device or a functional part that automatically sights and tracks the target.

A ninth aspect of the present invention provides an unmanned aerial vehicle that flies in accordance with information calculated in a process performed by the three-dimensional information processing unit or the apparatus in any one of the first to the eighth aspects of the present invention. A tenth aspect of the present invention provides a device that visually or auditorily provides information that is calculated in a process performed by the three-dimensional information processing unit or the apparatus in any one of the first to the eighth aspects of the present invention.

An eleventh aspect of the present invention provides an apparatus having the three-dimensional information processing unit in any one of the first to the sixth aspects of the present invention. This apparatus may include an image sensor that images the target and include a driving unit that oscillatingly drives the device or the functional part which measures the three-dimensional coordinates of the target, in a range in which the target is captured in the image taken by the image sensor.

A twelfth aspect of the present invention provides a method for controlling a target by operating a device or a functional part which measures three-dimensional coordinates of the target and by operating a laser scanner or a laser scanning part which obtains three-dimensional point cloud data of the target. The method includes positioning by operating the device or the functional part which measures the three-dimensional coordinates, to calculate the three-dimensional coordinates, and includes obtaining the three-dimensional point cloud data by operating the laser scanner or the laser scanning part. The method also includes calculating a movable range of the target from the three-dimensional coordinates and the three-dimensional point cloud data, and includes calculating a position of the target in the calculated movable range.

A thirteenth aspect of the present invention provides a non-transitory computer recording medium storing computer executable instructions for controlling a target by operating a device or a functional part which measures three-dimensional coordinates of the target and by operating a laser scanner or a laser scanning part which obtains three-dimensional point cloud data of the target. The computer executable instructions, when executed by a computer processor, cause the computer processor to: position by operating the device or the functional part which measures the three-dimensional coordinates to calculate the three-dimensional coordinates, and obtain the three-dimensional point cloud data by operating the laser scanner or the laser scanning part. The computer executable instructions also cause the computer processor to: calculate a movable range of the target from the three-dimensional coordinates and the three-dimensional point cloud data, and calculate a position of the target in the calculated movable range.

The present invention provides a technique that uses point cloud data containing three-dimensional coordinate information, which is obtained by a TS having a laser scanner, thereby enabling flight control of an unmanned aerial vehicle even in a place in which a navigation signal from a navigation satellite is difficult to receive. For example, an unmanned aerial vehicle may be made to fly in a tunnel with varying heights from a ground surface to a ceiling, in which a navigation signal from a navigation satellite is difficult to receive. Even in such a case, the present invention enables the unmanned aerial vehicle to fly while maintaining a constant distance from the ceiling or the ground surface.

BRIEF DESCRIPTION OF DRAWINGS

FIG. 7 is a conceptual diagram showing an example of an embodiment using an image sensor.

DETAILED DESCRIPTION

Overview

In the present invention, flight control of an unmanned aerial vehicle is performed by using position data and point cloud data. The position data is obtained by positioning the unmanned aerial vehicle that is flying. The point cloud data is obtained by scanning the unmanned aerial vehicle that is flying. An example of the unmanned aerial vehicle includes a UAV, a drone, and a quadcopter. In this embodiment, a UAV is exemplified as a target to be controlled, and the controlled UAV is positioned and scanned by a TS having a laser scanner or a laser scanning function, to control flight of the UAV. In the positioning, distance and angle to the UAV are measured.

Figure 1:
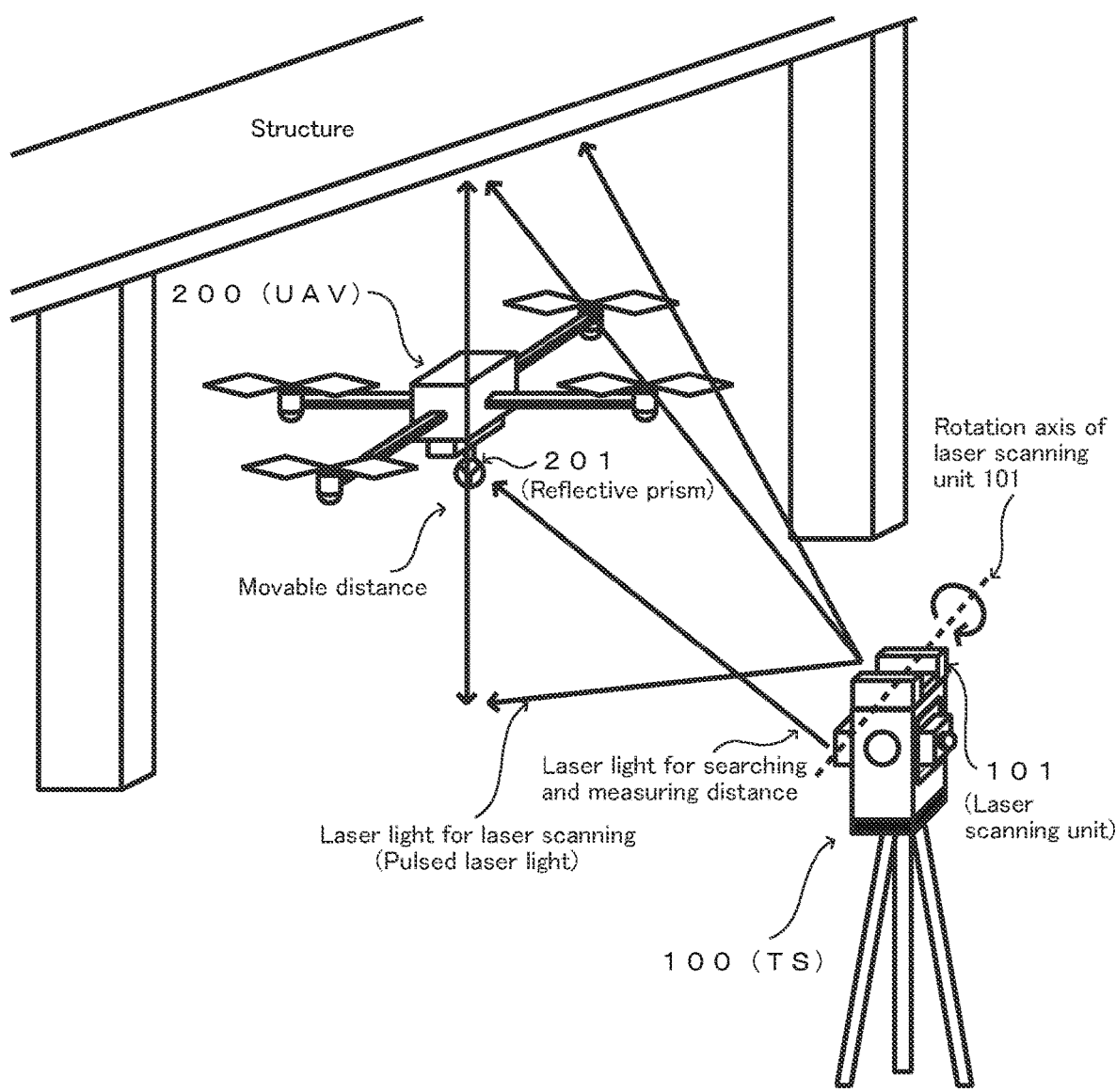
FIG. 1 is a conceptual diagram of an embodiment.

FIG. 1 is a conceptual diagram of this embodiment. FIG. 1 shows a TS 100 with a laser scanning function and also shows a UAV 200 that flies under a structure. The UAV 200 is positioned and scanned at an appropriate time by the TS 100, to be controlled.

Structure of TS

Figure 2:
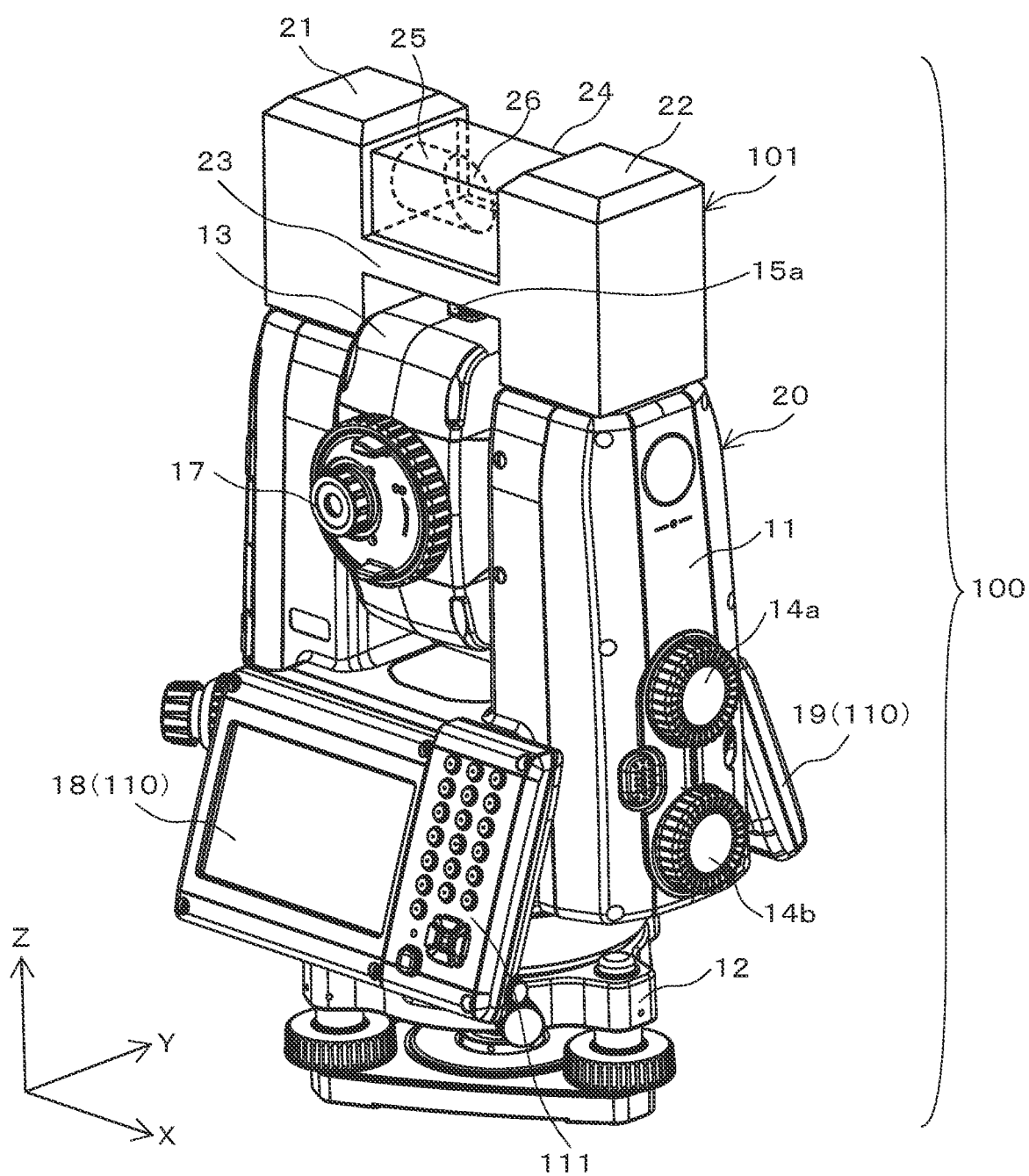
FIG. 2 is a perspective view of a TS.
Figure 3:
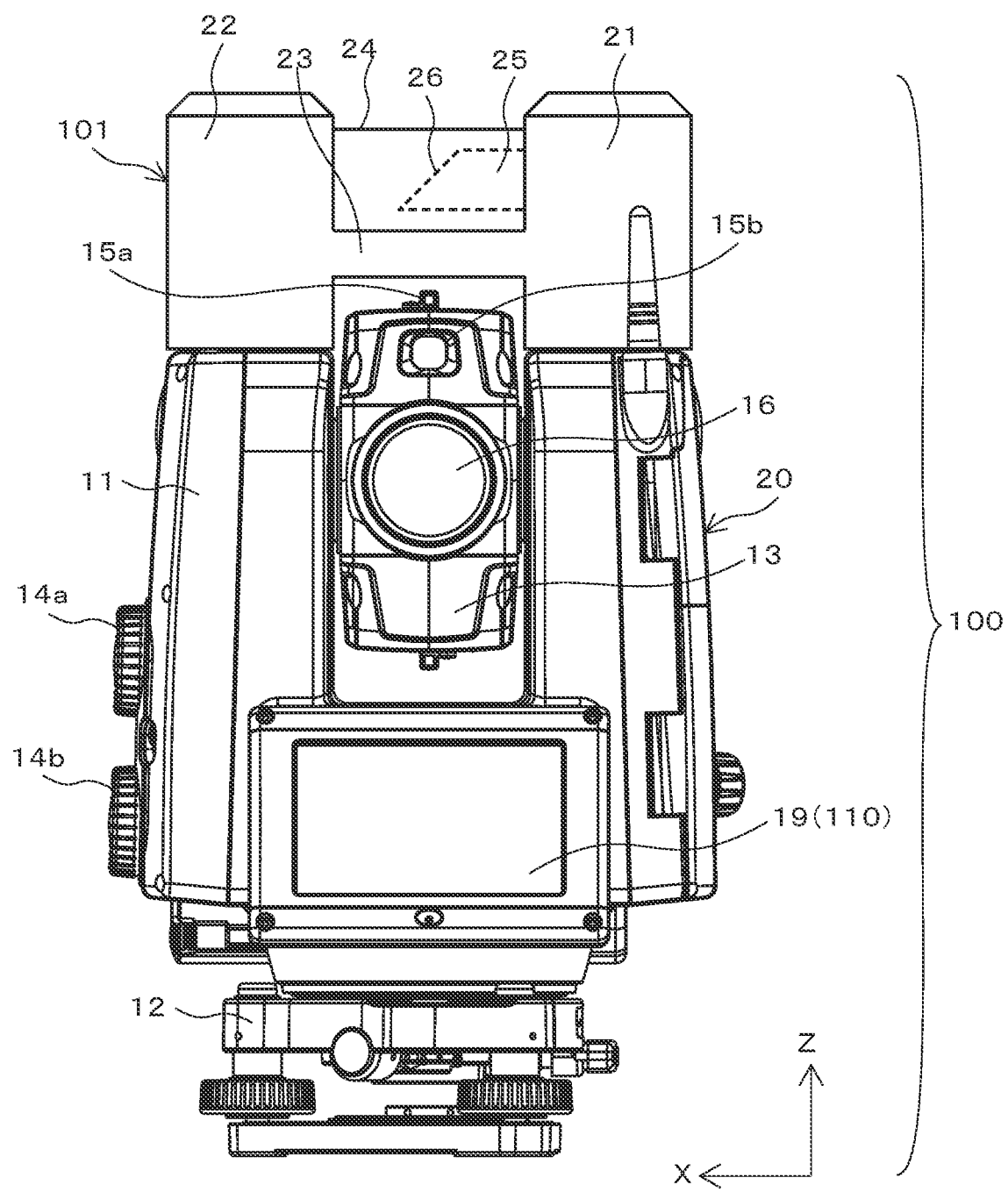
FIG. 3 is a front view of the TS.

FIG. 2 shows a perspective view of the TS 100 in FIG. 1. FIG. 3 shows a front view of the TS 100. The TS 100 has a laser scanning function for searching for a target or a reflective prism mounted on the target and also has a mechanism for automatically sighting the captured target or the captured reflective prism mounted on the target.

The automatic sighting mechanism has a tracking-light emitting unit 104, a tracking-light receiving unit 105, a horizontal rotation driving unit 108, a vertical rotation driving unit 109, and an automatic sighting controlling section 301. The tracking-light emitting unit 104 and the tracking-light receiving unit 105 constitute a tracking light transceiver. The horizontal rotation driving unit 108 and the vertical rotation driving unit 109 constitute a motor driving mechanism for sighting using the tracking light. The automatic sighting controlling section 301 controls automatic tracking. In this embodiment, the automatic sighting controlling section 301 is included in a three-dimensional information processing unit 300 that is provided to a calculation and control part 113 of the TS 100. The TS 100 has an automatic sighting function, which significantly reduces the work of an operator for sighting a target.

The TS 100 has a laser-based distance measuring function for measuring a distance to a target by using distance-measuring laser light. The TS 100 also has a function of measuring a direction of the target, of which the distance is measured by using the laser light, in terms of a horizontal angle and a vertical angle (elevation angle or depression angle). The TS 100 also has a function for calculating a three-dimensional position of the target in terms of coordinates from the distance and direction of the target, that is, a positioning function. The TS 100 further has a laser scanning function for obtaining point cloud data. The positioning function is a function of a TS, which is a typical function originally provided to the TS, and the positioning function enables highly accurate measurement of a position of a target.

As shown in FIG. 2, the TS 100 has a body 20 and a laser scanning unit 101 that are coupled in a composite manner. The TS 100 has a main unit 11 that is held in a horizontally rotatable manner by a base 12. The base 12 may be fixed on a top of a tripod (not shown). The main unit 11 has an approximately U-shape with two extending parts that extend upwardly viewed from a Y-axis direction. The main unit 11 also has a movable unit 13 that is held between the two extending parts so as to be controllable in a vertical angle (elevation angle and depression angle).

The main unit 11 is rotated relative to the base 12 by a motor. That is, the horizontal rotation angle of the main unit 11 relative to the base 12 is controlled by the motor. The vertical angle of the movable unit 13 is controlled by a motor. Driving to control the horizontal rotation angle and the vertical angle is performed by the horizontal rotation driving unit 108 and the vertical rotation driving unit 109. The horizontal rotation driving unit 108 and the vertical rotation driving unit 109 are contained in the main unit 11. The horizontal rotation driving unit 108 and the vertical rotation driving unit 109 are shown in the block diagram in FIG. 4. Details of the horizontal rotation driving unit 108 and the vertical rotation driving unit 109 are described later.

The main unit 11 has a horizontal rotation angle controlling dial 14a and a vertical angle controlling dial 14b arranged thereon. The horizontal rotation angle controlling dial 14a is operated to adjust the horizontal rotation angle of the main unit 11 and the movable unit 13. The vertical angle controlling dial 14b is operated to adjust the vertical angle of the movable unit 13.

The movable unit 13 has a rectangular cylindrical sighting unit 15a for approximate sighting, arranged on a top thereof. The movable unit 13 also has an optical sighting unit 15b with a visual field narrower than that of the sighting unit 15a and has a telescope 16 that can be collimated with high accuracy.

An image captured by the sighting unit 15b and the telescope 16 is visually recognized by looking into an eyepiece 17. The telescope 16 also serves as an optical system for distance-measuring laser light and for tracking light. The tracking light is used to track and capture an object of which a distance is to be measured. An example of the object includes a target using a dedicated reflective prism. The optical system is designed so that the optical axes of the distance measuring light and the tracking light will coincide with an optical axis of the telescope 16. The structure of this part is the same as that of a commercially available TS.

The main unit 11 has displays 18 and 19 mounted thereto. The display 18 is integrated with a controller 111, which is described later. The displays 18 and 19 display various pieces of information necessary to operate the TS 100, surveying data, and other information. These two displays are mounted in order to enable viewing the display from either the front side or the back side without having to rotate the main unit 11. Details of the structure of the TS are disclosed in, for example, Japanese Unexamined Patent Applications Laid-Open Nos. 2009-229192 and 2012-202821.

The main unit 11 has the laser scanning unit 101 that is fixed on a top. The laser scanning unit 101 has a first column 21 and a second column 22. The first column 21 and the second column 22 are connected by a connecting part 23. The space over the connecting part 23 between the first column 21 and the second column 22 is covered with a protective case 24. The protective case 24 is made of a member that transmits laser scanning light. The protective case 24 houses a rotating part 25 that protrudes from the first column 21 in an X-axis direction. An end of the rotating part 25 is obliquely cut off, and this end has a tilt mirror 26 fixed thereon.

The rotating part 25 is driven to be rotated around the X-axis by a motor contained in the first column 21. The first column 21 contains, in addition to the motor, a driving circuit for driving the motor and a control circuit for the driving circuit. The rotating part 25 may be made to protrude in a Y-axis direction from the first column 21. In this case, the rotating part 25 is rotated around the Y-axis.

The second column 22 contains a light emitting part that generates laser scanning light, which is pulsed laser light for laser scanning, a light receiving part that receives laser scanning light reflected back from an object, and an optical system for the light emitting part and the light receiving part. The laser scanning light is emitted from an inside of the second column 22 to the tilt mirror 26 and is reflected thereat to exit to the outside via the transparent protective case 24. The laser scanning light that is reflected back from an object reverses the path of the emitted light and is received by the light receiving part in the second column 22.

The point that reflects the laser scanning light is positioned as a scanning point by referring to light emission timing and light reception timing of the laser scanning light as well as a rotation angle of the rotating part 25 and a horizontal rotation angle of the main unit 11 at each of these timings.

The pulsed laser light for the laser scanning is emitted in an extending direction of the rotation axis of the rotating part 25 and is reflected at a right angle by the tilt mirror 26. The pulsed laser light that is reflected by the tilt mirror 26 is intermittently emitted from the transparent protective case 24 to the outside. At this time, the laser scanning light is emitted while the rotating part 25 rotates. Thus, the laser scanning is performed on a scanning plane that is a vertical plane along a Y-Z plane in FIG. 2. The entire structure of the TS 100 is determined to make the optical axis of the distance measuring light, which is emitted from the telescope 16 of the body 20 of the TS 100, be contained in the scanning plane. The pulsed laser light is emitted while the main unit 11 is horizontally rotated around a Z-axis. As a result, the entirety of the surroundings or a necessary range is subjected to the laser scanning. In one example, multiple pulsed beams of the laser light may be emitted at the same time.

Rotating the main unit 11 horizontally around the Z-axis is performed by the mechanism that rotates the main unit 11 relative to the base 12 by the motor. In a case of performing only laser scanning, a dedicated mechanism that rotates only the laser scanning unit 101 may be mounted to the TS 100 in addition to the mechanism for rotating the main unit 11, and the laser scanning may be performed by the dedicated mechanism.

The technique relating to the laser scanner is disclosed in Japanese Unexamined Patent Applications Laid-Open Nos. 2010-151682 and 2008-268004 and in U.S. Pat. No. 8,767, 190, for example. The laser scanner can be one that electronically performs scanning, as disclosed in U.S. Patent Application Publication No. 2015/0293224.

Figure 4:
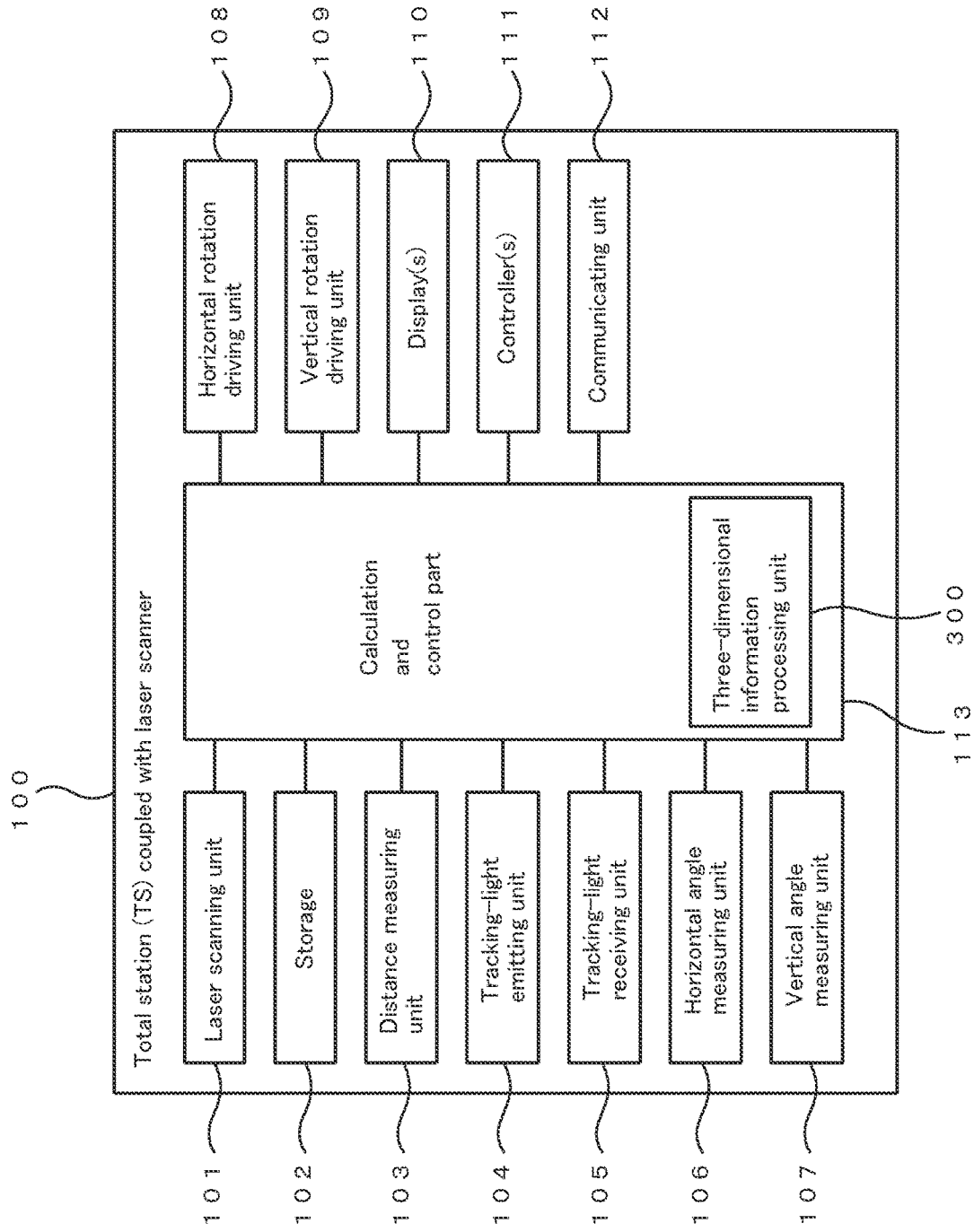
FIG. 4 is a block diagram of the TS.

FIG. 4 is a block diagram of the TS 100. The TS 100 includes the laser scanning unit 101, a storage 102, a distance measuring unit 103, the tracking-light emitting unit 104, the tracking-light receiving unit 105, a horizontal angle measuring unit 106, a vertical angle measuring unit 107, the horizontal rotation driving unit 108, the vertical rotation driving unit 109, displays 110, the controllers 111, a communicating unit 112, and the calculation and control part 113.

The laser scanning unit 101 scans a target to be measured with pulsed laser light, receives the pulsed laser light reflected thereat, and obtains the outline of the object in terms of three-dimensional coordinates of point cloud data. That is, the laser scanning unit 101 has a function similar to that of a commercially available three-dimensional laser scanner. The three-dimensional coordinates of the point cloud data use the same coordinate system as a coordinate system of coordinates that are obtained by each of the distance measuring unit 103, the horizontal angle measuring unit 106, and the vertical angle measuring unit 107, which are described later. The storage 102 stores information such as control programs necessary for operating the TS 100, various kinds of data, and survey results.

The distance measuring unit 103 measures a distance to the target by using distance-measuring laser light. The distance measuring unit 103 includes a light emitting element for the distance-measuring laser light, a light irradiating optical system, a light receiving optical system, a light receiving element, a distance measuring calculation section, and a light path for distance measuring reference light. The distance to the object is calculated from a phase difference between distance measuring light, which is reflected back from the object, and reference light. The method for calculating the distance is the same as that in ordinary laser distance measurement.

The tracking-light emitting unit 104 and the tracking-light receiving unit 105 search for a reflective prism by using searching laser light that is composed of triangular pyramid-shaped or fan-shaped beams. The reflective prism is mounted on a search object, which is a target to be sighted. The reflective prism is used as a target to be searched for and be irradiated by a laser, to perform automatic sighting of the search target, which is the target to be sighted. That is, the searching laser light that is emitted by the tracking-light emitting unit 104 is emitted to the reflective prism, and the TS 100 is controlled so that light reflected back from the reflective prism will be at the center of the light receiving element of the tracking-light receiving unit 105, whereby the sighted target is tracked. In more detail, this control is performed by the automatic sighting controlling section 301 of the three-dimensional information processing unit 300.

The horizontal angle measuring unit 106 and the vertical angle measuring unit 107 respectively measure a horizontal direction angle and a vertical direction angle (elevation angle or depression angle) of the target of which the distance is measured by the distance measuring unit 103. An optical system for the distance measuring unit 103, the tracking-light emitting unit 104, and the tracking-light receiving unit 105 is provided to a casing part of which horizontal rotation and elevation or depression angle are controllable. The horizontal direction angle and the vertical direction angle are measured by an encoder. The output of the encoder is received by the horizontal angle measuring unit 106 and the vertical angle measuring unit 107, and the horizontal direction angle and the vertical direction angle (elevation angle or depression angle) are measured.

The horizontal rotation driving unit 108 includes a motor that controls the horizontal rotation of the casing part, a driving circuit for the motor, and a controlling circuit for the driving circuit. The vertical rotation driving unit 109 includes a motor that controls the elevation angle and the depression angle of the casing part, a driving circuit for the motor, and a controlling circuit for the driving circuit. The casing part has the optical system for the distance measuring unit 103, the tracking-light emitting unit 104, and the tracking-light receiving unit 105. The laser scanning unit 101 also horizontally rotates in conjunction with the casing part.

The displays 110 provide or display information such as a processing result, by means of a technique, for example, a graphical user interface (GUI), to enable an operator or a user using the TS 100 to visually recognize the information. The displays 110 correspond to the above-described displays 18 and 19. The controller 111 has a numeric keypad, a cross operation button, and other operation parts arranged thereon, which are used to perform various operations relating to the TS 100 and to input data. The display 110 and the controller 111 may be integrated by using a touch panel. The touch panel has a screen that shows information to be touched by an operator, and the touch panel operates in response to the touch operation by the operator.

The communicating unit 112 transmits and receives operation information of the UAV 200 and various kinds of data. The communicating unit 112 has a wireless communication function for transmitting and receiving a control signal of the UAV 200 between itself and the UAV 200 or a control terminal of the UAV 200. The control terminal of the UAV 200 is a controller that is operated by a ground operator, who controls the UAV 200. The communicating unit 112 may also transmit and receive the point cloud data, which is obtained by the laser scanning unit 101, and data that is generated from the point cloud data, between itself and other apparatuses, for example, an external information processing apparatus separated from the TS 100, such an electronic computer.

The communicating unit 112 may also have a wired communication function or an optical communication function in addition to the wireless communication function. For example, the point cloud data that is obtained by the laser scanning unit 101 and data that is generated from the point cloud data are communicated by using the wired communication function or the optical communication function.

The calculation and control part 113 includes the three-dimensional information processing unit 300, which is described later. The calculation and control part 113 controls calculation processes relating to various kinds of movement control of the TS 100 and also controls management of data that is stored in the storage 102. For example, the calculation and control part 113 includes an electronic circuit such as a central processing unit (CPU), an application specific integrated circuit (ASIC), or a programmable logic device (PLD) such as a field programmable gate array (FPGA). In one example, some functions of the calculation and control part 113 may be implemented by dedicated hardware, and the rest may be implemented by a general-purpose microcomputer.

Whether each of the functional sections of the calculation and control part 113 is to be constructed of dedicated hardware or is to be constructed of software so that programs are executed by a CPU is selected in consideration of necessary operating speed, cost, amount of electricity consumed, and other factors. Constructing the functional section by dedicated hardware and constructing the functional section by software are equivalent to each other from the point of view of implementing a specific function. Of course, implementing each of the functional sections by using a device is also equivalent to these cases.

The TS 100 that uses the present invention is not limited to a surveying apparatus, typically, a TS, and the TS 100 can be embodied by any other apparatus on the condition that the apparatus has a surveying function and a laser scanning function. For example, an apparatus having these functions, such as a camera, a portable terminal, or a mobile phone, may be used as the TS 100 using the present invention, instead of the surveying apparatus.

Structure of UAV

The UAV 200 is an unmanned aerial vehicle configured to fly in the air, and the UAV 200 has a reflective prism 201 to enable automatic sighting and automatic tracking of the UAV 200 by the TS 100. The UAV 200 also has a communication function for receiving a flight control signal. The communication function makes the UAV 200 receive an operation instruction, which is transmitted from the outside, as a control signal, and flight of the UAV 200 is controlled. The communication function of the UAV 200 may be made to transmit and receive a signal and information between the UAV 200 and the TS 100 or other communication apparatus.

Structure of Three-Dimensional Information Processing Unit

Figure 5:
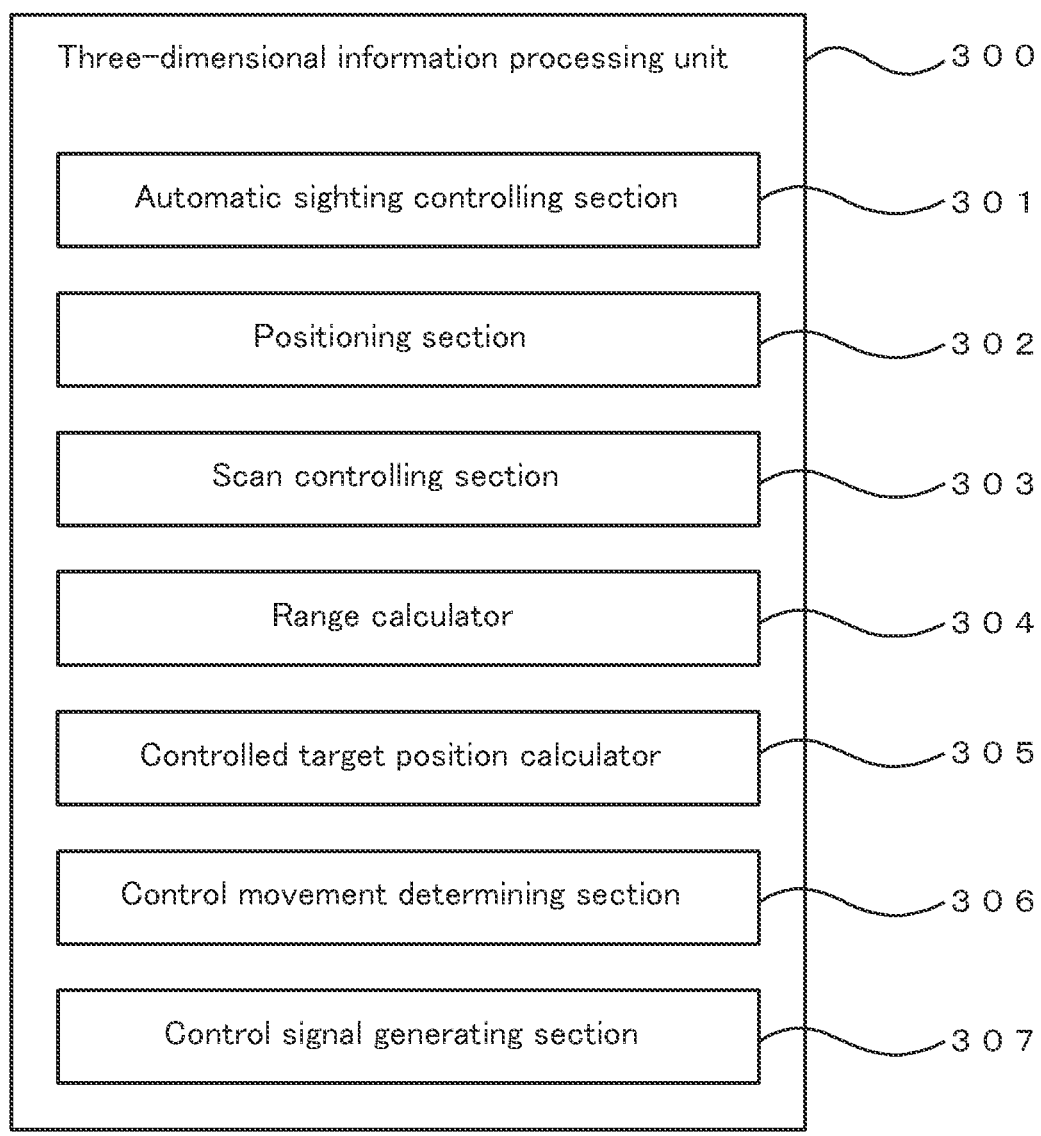
FIG. 5 is a block diagram of a three-dimensional information processing unit to be provided to the TS.

FIG. 5 is a block diagram of three-dimensional information processing unit 300. The three-dimensional information processing unit 300 comprehensively controls the processing in the present invention and includes the automatic sighting controlling section 301, a positioning section 302, a scan controlling section 303, a range calculator 304, a controlled-target position calculator 305, a control movement determining section 306, and a control signal generating section 307.

The automatic sighting controlling section 301 makes each functional unit or each device function or operate to track a target. For example, the tracking-light emitting unit 104 and the tracking-light receiving unit 105 of the TS 100 are made to function to track the UAV 200.

The positioning section 302 makes each functional unit or each device function or operate to obtain three-dimensional coordinates of the target. For example, the distance measuring unit 103, the horizontal angle measuring unit 106, and the vertical angle measuring unit 107 of the TS 100 are made to function for the UAV 200 that is tracked by control of the automatic sighting controlling section 301, whereby three-dimensional coordinates of the UAV 200 based on the TS 100 are obtained.

The scan controlling section 303 makes a laser scanning functional unit or a laser scanner function or operate to obtain point cloud data of the target. The obtained point cloud data is combined with the three-dimensional coordinate data obtained by the positioning section 302. For example, the laser scanning unit 101 of the TS 100 is made to function, whereby point cloud data containing three-dimensional coordinate information is obtained.

The range calculator 304 calculates a distance between objects that exist in the scanning direction of the controlled target, from the point cloud data containing the three-dimensional coordinate information, which is obtained by the scan controlling section 303. The distance between the objects is used as a controlled target movable range. The controlled target movable range is calculated as follows: point cloud data of a prior point and a posterior point that cross the scanning directional line for the controlled target is extracted from among the point cloud data, as objects that exist on the scanning directional line for the controlled target, and a coordinate difference in the scanning direction between the two points provides the controlled target movable range. More exactly, the controlled target is the reflective prism mounted on the controlled target. The scanning directional line includes a vertical line and a horizontal line. Instead of the point cloud data, a position that has average coordinates of points in the proximity to the prior point and a position that has average coordinates of points in the proximity to the posterior point may be extracted as the objects.

In a case in which no point cloud data is extracted from the scanned range, the range calculator 304 determines that no object that is expected to become an obstacle exists in the scanned range, and the range calculator 304 performs a process by presuming that the whole scanned range is a controlled target movable range. For example, a vertical plane along the Y-Z plane in FIG. 2 may be used as a scanning plane, and laser scanning may be performed in a range of 0 to L along the vertical plane, that is, the laser scanning may be performed in the range: $Y=0$ to L in which Y is a parameter. Under these conditions, in a case in which no point cloud data suggesting an obstacle is extracted, the range: $Y=0$ to L is set as the controlled target movable range.

The controlled target position calculator 305 calculates a position of the controlled target, more exactly, the reflective prism mounted on the controlled target, in the controlled target movable range, which is calculated by the range calculator 304. The position of the controlled target is calculated in terms of absolute value or relative value, relative to the range that is calculated by the range calculator 304.

The control movement determining section 306 determines movement to be performed by the controlled target, on the basis of the information of the position in a space, which is calculated by the controlled target position calculator 305, and on the basis of a set control method. The control method to be set includes a method of positioning the controlled target at the center of the space and a method of positioning the controlled target at a point that has a constant distance from an end of the space. The set control method can be changed to have any control contents, in accordance with the situation or other factors at the time of implementing the present invention.

The control movement determining section 306 performs a process as described below. For example, while a UAV 200 is flying in a space with 10 meters between structures A and B, the UAV 200 may fly at a position 1 meter from the structure A and 9 meters from the structure B. In this situation, if a control method is set so that the controlled target will be positioned at the center in the space, the control movement determining section 306 determines that the UAV 200 should be moved 4 meters toward the structure B.

The control signal generating section 307 generates a control signal to cause the controlled target to perform the movement determined by the control movement determining section 306. In this embodiment, the generated control signal is transmitted by the communicating unit 112 of the TS 100 to be used for controlling the UAV 200.

In a case in which the control movement determining section 306 determines that no control movement is particularly necessary for the controlled target, it is not necessary for the control signal generating section 307 to generate the control signal because no further control is necessary, but the control signal generating section 307 may generate a signal having only the result of the process performed by the controlled target position calculator 305.

The control signal that is generated by the control signal generating section 307 is not limited to a signal that directly controls the controlled target. The control signal may be values that are calculated by the range calculator 304, the controlled target position calculator 305, and the control movement determining section 306, or may be information introduced from these calculated values. The calculated values or the information may be displayed on or be emitted by audio from a controller of the controlled target, such as an unmanned aerial vehicle, to cause an indirect control through an operator or a user.

In one example of the indirect control, a distance from a controlled target, such as an unmanned aerial vehicle, to an object that is expected to become an obstacle, may be displayed on or be emitted by audio from a controller of the controlled target. In another example of the indirect control, a warning notice or an alarm may be output from the controller when an object that is expected to become an obstacle approaches the controlled target. In view of this, the UAV 200 of this embodiment may be one that autonomously flies on a predetermined flight route or one that flies under operation of an operator.

The point cloud data that is obtained by the scan controlling section 303 and the setting data of the control method that is referenced by the control movement determining section 306 may be stored in any storage. An example of the storage includes a storage (not shown) that is provided to the three-dimensional information processing unit 300, a storage of the apparatus provided with the three-dimensional information processing unit 300, such as the storage 102 of the TS 100 in the case of this embodiment, and a storage of an apparatus that is communicable with the three-dimensional information processing unit 300.

Example of Processing

Figure 6:
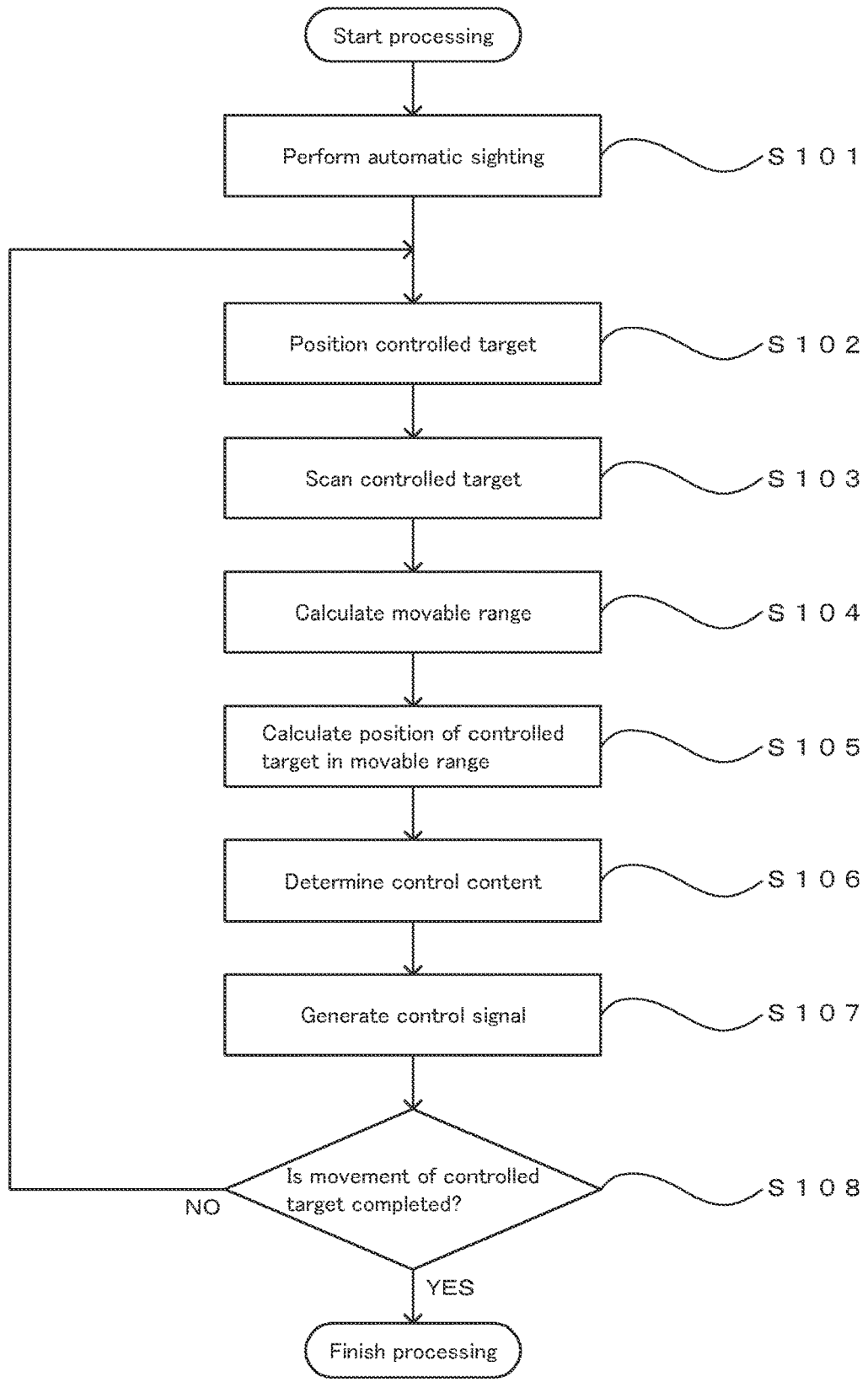
FIG. 6 is a flowchart showing an example of processing.

An example of the processing in this embodiment is shown in FIG. 6. The processing described in this embodiment assumes that the laser scanning unit 101 of the TS 100 performs scanning the UAV 200 in a vertical direction, that is, along the Y-Z plane in FIG. 2.

First, the TS 100 automatically sights the reflective prism that is mounted on the UAV 200 to be ready for automatic tracking following the flight of the UAV 200 (step S101). On the condition that the TS 100 automatically tracks the UAV 200, the positioning, which is performed in the next step, is conducted.

Next, the TS 100 positions a target to be controlled, that is, the UAV 200, while automatically tracking the UAV 200, to obtain three-dimensional coordinate data of the UAV 200 (step S102). The TS 100 also performs scanning in the vertical direction of the controlled UAV 200, to obtain point cloud data in the scanned range (step S103).

One point that corresponds to an object existing on the scanning direction is extracted in each of a vertical upward direction and a vertical downward direction of the UAV 200, from the point cloud data obtained in the processing in step S103, and a movable range of the UAV 200 is calculated from a difference of coordinates in the scanning direction between the two points (step S104). The results in steps S102 and S104 are used to calculate a position of the UAV 200 in the movable range of the UAV 200 (step S105).

The position of the UAV 200 in the movable range, which is calculated in step S105, is checked against a preliminarily set control method of the UAV 200, to determine a control content or a movement content of the UAV 200 (step S106). A control signal that causes the UAV 200 to execute the control content, which is determined in step S106, is generated (step S107). If it is determined that no further control is necessary for the UAV 200, in step S106, it is not necessary to generate the control signal, and in some cases, a signal for notifying that there is no limitation in the movement, may be transmitted.

The processing from step S102 to S107 is repeatedly performed until the flight of the UAV 200 is completed. The processing from step S102 to 107 is performed every few seconds to continuously control the flight of the UAV 200 (step S108). The processing is finished in accordance with the completion of the flight of the UAV 200.

The determination of the completion of the flight of the UAV 200 in step S108 may be performed by an operator who controls the UAV 200 or may be performed by a functional unit, for example, a processing completion determining section (not shown) included in the three-dimensional information processing unit 300. For example, this functional unit determines completion of the flight of the UAV 200 when the three-dimensional coordinate data of the UAV 200, which is obtained in step S102, does not change for a specific time. In one example, the processing completion determining section may include a functional part for receiving determination of an operator. In this case, the processing completion determining section determines completion of the flight of the controlled UAV 200 by using judgment of the operator in addition to its own judgment.

In this embodiment, the three-dimensional information processing unit 300 repeatedly performs the processing in step S102 to S108 on the order of several seconds or less. At this time, the amount of the calculation processing of the point cloud data may be increased. In view of this, point cloud data may be obtained in advance in a range in which the UAV 200 is planned to fly.

In this case, the point cloud data that is obtained in step S103 is preferentially used for the determination in step S106, and the preliminarily obtained data is used as complementary data for the point cloud data obtained in step S103. This enables the three-dimensional information processing unit 300 to repeatedly perform the processing from step S102 to S107 at a less frequency. Furthermore, point cloud data of an obstacle in a range, which is difficult to obtain at the same time as the tracking of the UAV 200, is able to be used for controlling the UAV 200.

In the processing in steps S103 and S104, the scanning is performed on only the Y-Z plane to detect an object existing in the Y-Z plane. This method of detecting an object only in the Y-Z plane, that is, the vertical plane as viewed from the TS 100, is less safe for the controlled target but requires a less calculation amount for the processing of the point cloud data. That is, the safety for the controlled target and the processing amount of the point cloud data are in a trade-off relationship. The importance of safety depends on requirements or needs of each user using the present invention. From this point of view, the range from which point cloud data is collected may be set variable to increase versatility of the present invention. A method for improving the safety for the controlled target by increasing the amount of collecting the point cloud data is described in the following modification examples.

Specific Example

In one example shown in FIG. 1, it is assumed that the UAV 200 is planned to fly under a structure, which is a bridge. In this case, a movable distance in a vertical direction is obtained by means of laser scanning, and flight control is performed so that the UAV 200 will fly at an altitude at which a ratio in the vertical direction is a predetermined value. For example, the flight control is performed so that a ratio of a distance of the UAV 200 from the ground surface and a distance of the UAV 200 to the bridge will be 1:1 in the vertical direction. Thus, the UAV 200 is controlled to fly at an altitude in the middle between the ground surface and the bridge, under the bridge.

While a three-dimensional structure of the bride is obtained by the laser scanning unit 101, a three-dimensional position of the UAV 200 is positioned in real time by the TS 100 at the same time, whereby the flight control of the UAV 200 is performed by avoiding interference with the bridge.

The present invention can also be used in a limited space such as an internal space of a structure and an internal space of a building. In one example, it is assumed that the UAV 200 is planned to fly inside a tunnel. In this case, three-dimensional coordinates of a road surface in the tunnel and a ceiling of the tunnel are obtained by performing laser scanning in a low-angle direction and in a high-angle direction, respectively. Moreover, the UAV 200 is captured and is positioned by the TS 100. This enables the UAV 200 to fly while maintaining a predetermined position between the road surface or a bottom surface and the ceiling of the tunnel. For example, the predetermined position is an altitude 4 meters above the road surface and 2 meters below the ceiling surface.

In these cases, while the laser scanning in the high-angle direction and in the low-angle direction is performed at the same time as the tracking and the positioning of the UAV 200, data of preliminarily obtained laser scanning point clouds may also be used. This enables flight control of the UAV 200 by referring to position data of an obstacle in a range from which the position data is difficult to obtain at the same time as the tracking of the UAV 200.

In the case of making the UAV 200 fly in the tunnel, for example, altitude of the UAV 200 in the tunnel is controlled by using laser scanning data that is obtained in real time, and the flight of the UAV 200 is controlled to avoid interference with a side wall of the tunnel, by using laser scanning data that is obtained in advance.

Modification Example 1

In the example of the processing from step S101 to S108 in the foregoing embodiment, the range from which the point cloud data is obtained in step S103 may be extended in a direction that is not included in the rotation direction of the rotating part 25, instead of the same direction as the rotation direction of the rotating part 25. In such a case, a control method used in step S106 is as follows.

It is assumed that a scan range in the vertical direction is represented as $Y_0$ to $Y_n$, whereas a scan range in a horizontal direction is represented as $X_0$ to $X_n$. Moreover, on the condition that the rotating part 25 rotates in the vertical direction, "n" number of sets of point cloud data may be obtained by scanning the scan range of $Y_0$ to $Y_n$ with "n" pulsed beams of laser light, through the scan range of $X_0$ to $X_n$ extending in the horizontal direction. That is, "n" number of sets of the point cloud data may be obtained by scanning the Y-Z plane at different X values.

In this case, the flight of the UAV 200 is controlled in consideration of safety by setting the most severe movable range of the UAV 200 by using the obtained "n" sets of point cloud data. Alternatively, the flight of the UAV 200 is controlled in consideration of executing flight by setting the most moderate movable range of the UAV 200 by using the obtained "n" sets of point cloud data.

The scan range of $X_0$ to $X_n$ in the direction that is not included in the rotation direction of the rotating part 25 can be small compared with the scan range of $Y_0$ to $Y_n$ in the same direction as the rotation direction of the rotating part 25. Thus, in the condition in which the rotation direction of the rotating part 25 is vertical along the UAV 200, it is possible to extend the scan range in the horizontal direction by using the mechanism that rotates the main unit 11 or the laser scanning unit 101 of the TS 100 around the Z-axis. In a case in which the TS 100 has a mechanism that enables rotation around the Z-axis, the method in this Modification Example and the method of the example of the foregoing processing from step S101 to S108 can be switched depending the request of a user of the present invention.

To scan in the vertical direction and in the horizontal direction, a TS 100 that scans the UAV 200 in the vertical direction and a TS 100 that scans the UAV 200 in the horizontal direction may be used together, as exemplified in the Modification Example 2 described below.

Modification Example 2

Although the scanning direction of the laser scanner, more exactly, the rotation direction of the rotating part 25, is the vertical direction along the UAV 200 in the foregoing embodiment, the scanning direction may be set in the horizontal direction along the UAV 200. Laser scanning in the horizontal direction is performed by reciprocatively or oscillatingly rotating the body 20 of the TS 100 in the horizontal direction at the same time as the laser scanning along the vertical plane by the laser scanning unit 101.

In this example, the laser scanning is performed in the horizontal direction at the same time as the laser scanning in the high-angle direction and in the low-angle direction. While the laser scanning is performed in the horizontal direction by reciprocatively or oscillatingly rotating the TS 100 in a lateral direction, the reflective prism of the UAV 200 is intermittently captured. However, the tracking of the UAV 200 is performed substantially without interruption by narrowing the scan range in the lateral direction.

In one example, in the scanning is performed in the horizontal direction by reciprocatively or oscillatingly rotating the TS 100 in the lateral direction, the scan range may be set so that the reflective prism of the UAV 200 will be captured in a tracking range at least once per second. This enables tracking the UAV 200 substantially without interruption.

As the frequency in terms of times per second for capturing the reflective prism of the UAV 200 increases, the tracking accuracy also increases. However, the upper limit of the frequency is limited by the mechanical movement speed of the TS 100 and the calculation speed relating to the tracking and the positioning. This processing enables obtaining laser scanning data of surroundings of the UAV 200 in the lateral direction while substantially tracking the UAV 200.

The scanning direction may also be changed by changing the structure of the rotating part 25 mounted to the TS 100. The change in the scanning direction enables obtaining data in any direction in a greater amount than the point cloud data that is obtained by rotating the main unit 11 or the laser scanning unit 101 of the TS 100, or by other means. As a result, an object in any direction is more easily detected. In this condition, the UAV 200 may be controlled on the basis of data obtained in the vertical direction and in the horizontal direction by using the TS 100 that scans the UAV 200 in the vertical direction and the TS 100 that scans the UAV 200 in the horizontal direction in combination.

Modification Example 3

The technique of the present invention may also be implemented by using an image sensor of a TS for tracking a target to be surveyed. Examples of this implementation are described below.

Modification Example 3-1

Normally, a controlled target position $P(X_T, Y_C)$ is fixed at the center $(X_C, Y_C)$ in an image taken by an image sensor, and a position of the reflective prism 201 captured by the image sensor is measured. A feedback control is performed so that a prism image corresponding to the reflective prism 201 will be at the center $(X_C, Y_C)$, whereby the reflective prism 201 mounted on the UAV 200 is tracked.

On the other hand, in this Modification Example, to correspond to the oscillating rotation of the TS 100 around the Z-axis shown in FIG. 2, the controlled target position $P(X_T, Y_C)$ is not fixed at the center $(X_C, Y_C)$ during the tracking, and the X component representing the component in the horizontal direction of the controlled target position $P(X_T, Y_C)$ is varied with time. FIG. 7 shows images taken by the image sensor for tracking, in a case in which the X component of a tracked controlled target position $P(X_T, Y_C)$ is moved with time on the condition that left end and right end in the X direction are respectively represented as $X_L$ and $X_R$ in the image taken by the image sensor for tracking.

In this case, a prism image on the image taken by the image sensor for tracking moves in a range: $X_T = X_L$ to $X_R$ on the basis of a sine wave function $A \sin(\omega t)$, in which the symbol "A" represents amplitude of oscillation of the TS 100 in the lateral direction around the Z-axis, the symbol "t" is time that is a variable, and the symbol "ω" is angular velocity. That is, variation in the amplitude "A" depending on the time "t" is measured as the movement of the prism image in the range of $X_L$ to $X_R$. Thus, even when the TS 100 oscillates in the lateral direction around the Z-axis, the prism image moves in the lateral direction in the image taken by the image sensor for tracking, whereby the movement of the reflective prism 201, that is, the movement of the UAV 200 having the reflective prism 201 mounted thereon, is tracked. The calculation operation relating to the control of the oscillating rotation of the TS 100 is performed by the calculation and control part 113, and driving of the oscillating rotation of the TS 100 is performed by the horizontal rotation driving unit 108.

The laser scanning along the vertical plane in the high-angle direction and in the low-angle direction may be performed by the laser scanning unit 101 while the lateral oscillation is performed. This enables laser scanning in a lateral range corresponding to the range of $X_L$ to $X_R$. That is, while the tracking and positioning of the UAV 200 are continued, laser scanning in the vertical and lateral directions is possible in the condition that the lateral direction is limited in a specific range.

For example, the main unit 11 of the TS 100 may be slightly rotated in the left direction, and a prism image of the reflective prism 201 may come to a position at the right end $(X_R, Y_C)$ that is set in the image taken by the image sensor for tracking. In this case, the distance from the TS 100 to the reflective prism 201 is measured by the measuring function of the TS 100. This is because the distance measuring light is emitted in a range with some degree of width, and light reflected back is measured by the distance measuring unit 103. While the scanning light is emitted oscillatingly in the lateral range corresponding to the range of $X_L$ to $X_R$, the distance measuring light may be oscillatingly and intermittently emitted to the reflective prism 201 in accordance with the movement. The distance measuring is possible also in this case.

The slight rotation of the main unit 11 of the TS 100 to the left causes the optical axis of the TS 100 in the horizontal direction to be displaced from the reflective prism 201. Thus, in this case, calculation of the position of the reflective prism 201 using a measured value from the horizontal angle measuring unit 106 contains a measurement error.

However, a direction in the horizontal direction of the reflective prism 201 as viewed from the TS 100 relative to the optical axis of the TS 100 is calculated by counting a number of pixels of the position of the prism image in the X-direction from the center in the image, which is imaged by the image sensor.

Thus, a three-dimensional position of the reflective prism 201 is calculated from the distance from the TS 100 to the reflective prism 201, which is measured by the distance measuring unit 103, and the direction of the reflective prism 201 on the basis of the image taken by the image sensor for tracking.

In performing the laser scanning in a laterally oscillating manner, even when the reflective prism 201 is displaced from the optical axis of the TS 100, three-dimensional positioning for the reflective prism 201 is continued on the condition that the reflective prism 201 is tracked in the image for tracking. Thus, while the tracking and positioning of the UAV 200 are continued, the movable range of the UAV 200 is set by extending the movable range in the lateral direction in addition to the vertical direction.

The processing relating to calculation of the position of the reflective prism 201 is performed by the positioning section 302 on the basis of the distance to the reflective prism 201 and the image taken by the image sensor for tracking.

Figure 8:
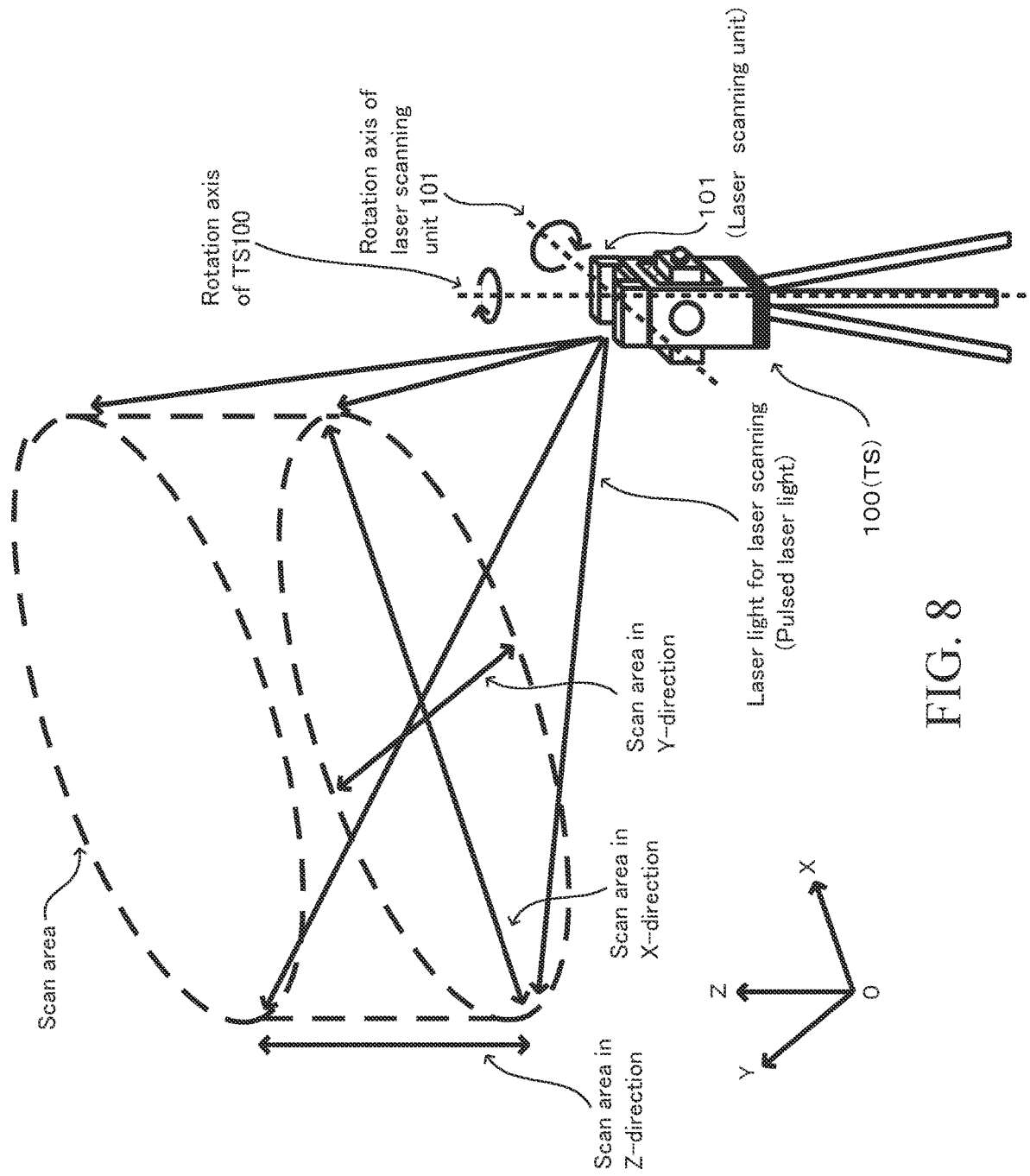
FIG. 8 is a conceptual diagram showing a scan area of a laser scanner mounted on the TS.

FIG. 8 shows a scan area of the laser scanning unit 101 mounted on the TS 100. As shown in FIG. 8, the laser scanning may be performed in a depth direction, which is a Y-axis direction. This technique enables detection of an obstacle and set of the movable range in a three-dimensional area centered at the UAV 200 while continuing tracking and positioning of the UAV 200. In this example, the laser scanning is performed in a lateral space of the UAV 200. Thus, for example, flight of the UAV 200 along a wall surface is controlled at a high accuracy.

Modification Example 3-2

Figure 9:
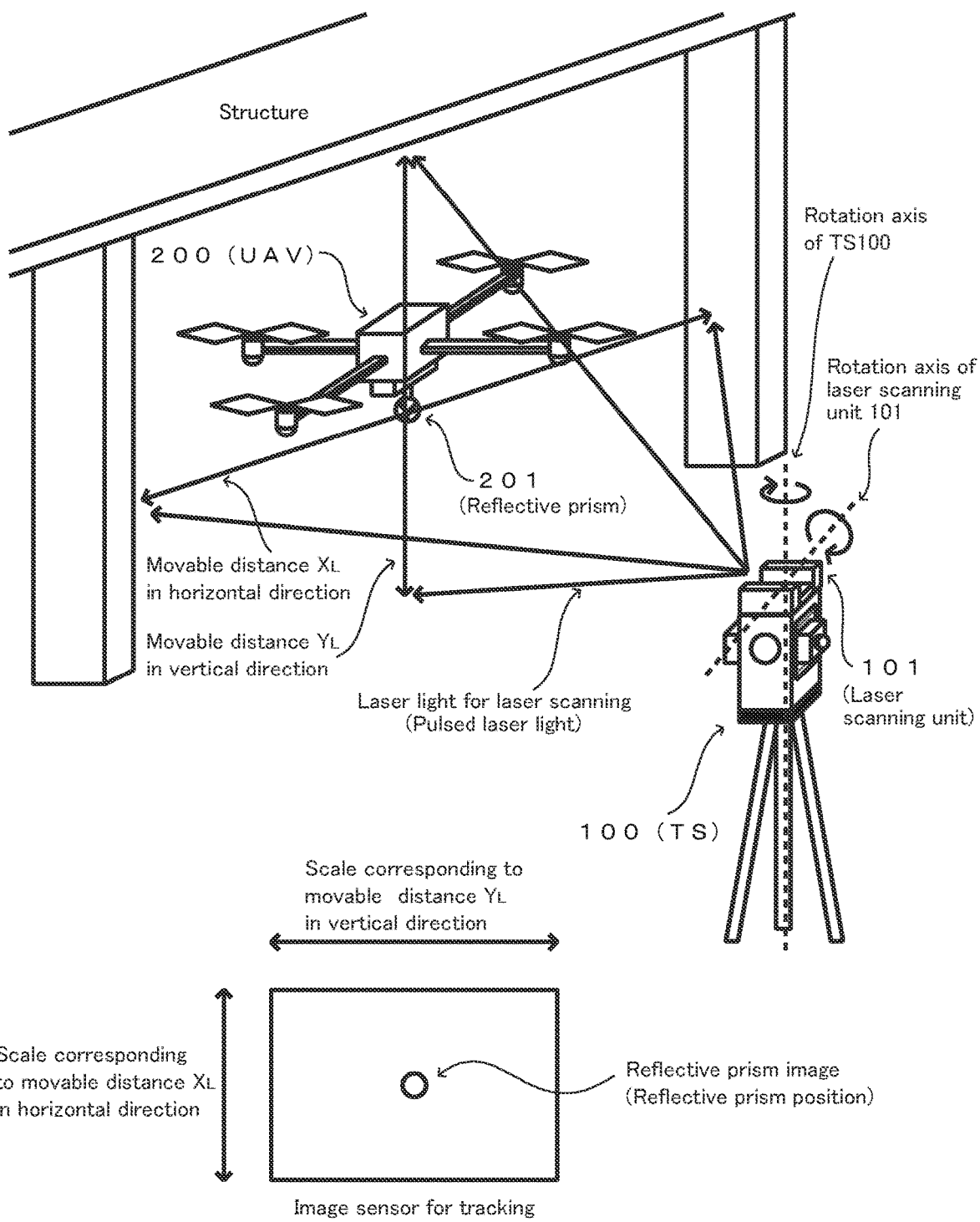
FIG. 9 is a conceptual diagram showing an example of an embodiment using an image sensor.

FIG. 9 is a conceptual diagram of an example of this Modification Example using an image sensor. As shown in FIG. 9, the movable range in the vertical direction of the UAV 200 may be made to correspond to a scale of a Y-axis of the image sensor for tracking, whereas the movable range in the horizontal direction of the UAV 200 may be made to correspond to a scale of an X-axis of the image sensor for tracking. In this condition, the image that is imaged by the image sensor for tracking reflects the movable range of the UAV 200. The movable range in the vertical direction of the UAV 200 is calculated in step S104 during the example of the processing from step S101 to S108 in the foregoing embodiment. Moreover, a calculation result of the position of the UAV 200 in the movable range, which is calculated in step S105, may be checked on the image taken by the image sensor for tracking, to track and control the UAV 200.

In this Modification Example, to perform the scanning in the scan area in a direction not included in the rotation direction of the rotating part 25, a mechanism for rotating the main unit 11 or the laser scanning unit 101 of the TS 100 around the Z-axis may be used. Alternatively, a TS 100 that scans the UAV 200 in the vertical direction and a TS 100 that scans the UAV 200 in the horizontal direction may be used together.

The technique relating to the image sensor that is used in a surveying apparatus, such as a TS, is disclosed in Japanese Unexamined Patent Application Laid-Open No. 2013-134220, for example.

Modification Example 4

This Modification Example is an example of an embodiment in a case of preliminarily obtaining point cloud data containing three-dimensional coordinate information, by positioning and scanning the whole of a site in which the present invention is planned to be implemented, in advance. In this case, while automatically tracking the UAV 200, the TS 100 positions the UAV 200 to obtain three-dimensional position information containing coordinates, and the TS 100 checks this three-dimensional position information against the preliminarily obtained point cloud data to calculate a distance between the UAV 200 and an object that is expected to become an obstacle. Thus, the UAV 200 is made to fly while maintaining a constant distance from an object that is expected to become an obstacle.

This modification example enables calculating a distance between the UAV 200 and an object that is expected to become an obstacle in either one of the vertical direction and the horizontal direction because the point cloud data of the whole site in which the present invention is implemented is obtained in advance.

Versatility

The three-dimensional information processing unit 300 performs the processing in step S101 to S103 in the example of the foregoing embodiment. This processing is executed for operating each function of the TS 100 via the calculation and control part 113 of the TS 100. Thus, in the condition in which a signal is transmitted and received between the calculation and control part 113 and the three-dimensional information processing unit 300, it is not necessary to provide the three-dimensional information processing unit 300 in the calculation and control part 113 as shown in FIG. 4 and also in a surveying apparatus such as the TS 100. That is, the three-dimensional information processing unit 300 may be a separate device. For example, the three-dimensional information processing unit 300 may be made as a separate device, and this three-dimensional information processing unit 300 may be used in combination with a three-dimensional laser scanner and a TS that are commercially available, to implement the present invention.

The technique of the present invention can also be used for a mobile body other than the unmanned aerial vehicle. For example, the present invention can also be used for a vehicle that travels on a road. In this case, the vehicle is controlled to travel while maintaining a constant distance from a structure on a road, such as a median strip or a curb. In general, in controlling a vehicle using a laser scanner, the laser scanner is normally mounted on a controlled target, that is, the vehicle. However, it is not necessary to provide the laser scanner on the vehicle in a case of using the present invention.

Advantages

The present invention enables avoiding an obstacle that is not predicted before a controlled mobile body starts moving, by obtaining information of surroundings of the controlled mobile body as point cloud data while the controlled mobile body moves.

The present invention can be used in a technique for controlling a mobile body.

What is claimed is:

1. A method for controlling flight of an unmanned aerial vehicle by using a surveying device that includes a total station and a laser scanner in combination,
the total station having a positioning function using laser light, the total station comprising a main unit that is horizontally rotatable,
the laser scanner being configured to perform laser scanning along a vertical plane, wherein the laser scanner is mounted on the main unit,
wherein the unmanned aerial vehicle has a target that reflects the laser light, and the laser light used for positioning has an optical axis that is included in the vertical plane, the method comprising:
determining a position of the target of the unmanned aerial vehicle by the total station while performing the laser scanning along the vertical plane by the laser scanner;
detecting an object that exists in a vertical direction of the unmanned aerial vehicle, based on point cloud data that is obtained by the laser scanning; and
calculating a movable range in the vertical direction of the unmanned aerial vehicle based on the detected object existing in the vertical direction of the unmanned aerial vehicle,
wherein, while the laser scanning along the vertical plane is performed, the main unit is oscillatingly rotated in a horizontal direction so that laser scanning is performed in a high-angle direction, in a low-angle direction, and the horizontal direction, the target is tracked by an image sensor of the main unit for tracking, and the main unit is oscillated in a condition in which the image sensor for tracking captures the target between a left end and a right end of an image that the image sensor for tracking can capture.

2. A non-transitory computer recording medium storing computer executable instructions for controlling flight of an unmanned aerial vehicle by using a surveying device that includes a total station and a laser scanner in combination,
the total station having a positioning function using laser light, the total station comprising a main unit that is horizontally rotatable,
the laser scanner being configured to perform laser scanning along a vertical plane, wherein the laser scanner is mounted on the main unit,
wherein the unmanned aerial vehicle has a target that reflects the laser light, and the laser light used for positioning has an optical axis that is included in the vertical plane,
the computer executable instructions that, when executed by a computer processor, cause the computer processor to perform operations comprising:

determining a position of the target of the unmanned aerial vehicle by the total station while performing the laser scanning along the vertical plane by the laser scanner;

detecting an object that exists in a vertical direction of the unmanned aerial vehicle, based on point cloud data that is obtained by the laser scanning; and calculating a movable range in the vertical direction of the unmanned aerial vehicle based on the detected object existing in the vertical direction of the unmanned aerial vehicle, wherein, while the laser scanning along the vertical plane is performed, the main unit is oscillatingly rotated in a horizontal direction so that laser scanning is performed in a high-angle direction, in a low-angle direction, and the horizontal direction, the target is tracked by an image sensor of the main unit for tracking, and the main unit is oscillated in a condition in which the image sensor for tracking captures the target between a left end and a right end of an image that the image sensor for tracking can capture.

3. The method for controlling flight of the unmanned aerial vehicle according to claim 1, wherein the main unit is oscillatingly rotated in the horizontal direction in the condition in which the total station performs positioning on the target at least once per second.

4. The non-transitory computer recording medium storing computer executable instructions for controlling flight of the unmanned aerial vehicle according to claim 2, wherein the main unit is oscillatingly rotated in the horizontal direction in the condition in which the total station performs positioning on the target at least once per second.

5. The method for controlling flight of the unmanned aerial vehicle according to claim 1, wherein multiple sets of point cloud data are obtained by the laser scanning.

6. The method for controlling flight of the unmanned aerial vehicle according to claim 1, further comprising repeating the steps of:

determining the position of the target of the unmanned aerial vehicle;

detecting the object that exists in the vertical direction of the unmanned aerial vehicle, based on point cloud data that is obtained by the laser scanning; and calculating the movable range in the vertical direction of the unmanned aerial vehicle based on the detected object existing in the vertical direction of the unmanned aerial vehicle.

7. The non-transitory computer recording medium storing computer executable instructions for controlling flight of the unmanned aerial vehicle according to claim 2, wherein multiple sets of point cloud data are obtained by the laser scanning.

8. The non-transitory computer recording medium storing computer executable instructions for controlling flight of the unmanned aerial vehicle according to claim 2, further comprising repeating the steps of:

determining the position of the target of the unmanned aerial vehicle;

detecting the object that exists in the vertical direction of the unmanned aerial vehicle, based on point cloud data that is obtained by the laser scanning; and calculating the movable range in the vertical direction of the unmanned aerial vehicle based on the detected object existing in the vertical direction of the unmanned aerial vehicle.

* * * * *